United States Patent [19]

Jones, III et al.

[11] Patent Number: 5,081,685
[45] Date of Patent: Jan. 14, 1992

[54] APPARATUS AND METHOD FOR READING A LICENSE PLATE

[75] Inventors: Creed F. Jones, III, Oliver Springs; Michael A. Goldston; David R. Patek, both of Knoxville, all of Tenn.

[73] Assignee: Westinghouse Electric Corp., Pittsburgh, Pa.

[21] Appl. No.: 277,682

[22] Filed: Nov. 29, 1988

[51] Int. Cl.$^5$ .............................................. G06K 9/00
[52] U.S. Cl. ........................................ 382/1; 382/22; 382/48
[58] Field of Search ................... 382/1, 30, 34, 46, 44, 382/22, 48

[56] References Cited

U.S. PATENT DOCUMENTS

| | | | |
|---|---|---|---|
| 3,550,084 | 12/1970 | Bigelow et al. | 382/31 |
| 3,725,862 | 4/1973 | Roberts | 340/146 |
| 3,818,445 | 6/1974 | Neville | 340/146 |
| 3,846,753 | 11/1974 | Spanjersbee | 340/146 |
| 4,034,341 | 7/1977 | Isond | 340/146 |
| 4,097,847 | 6/1978 | Forsen et al. | 382/22 |
| 4,173,015 | 10/1979 | Owens | 340/146 |
| 4,180,799 | 12/1979 | Smith | 340/146 |
| 4,180,800 | 12/1979 | Isshaiki et al. | 340/146 |
| 4,251,799 | 2/1981 | Jib | 340/146 |
| 4,368,970 | 1/1983 | Fuell | 356/71 |
| 4,403,340 | 9/1983 | Kumpf et al. | 382/48 |
| 4,468,703 | 8/1984 | Fijiwara et al. | 382/51 |
| 4,484,348 | 11/1984 | Shizuno | 382/48 |
| 4,491,923 | 1/1985 | Belt et al. | 382/22 |
| 4,504,969 | 3/1985 | Suzuki et al. | 382/48 |
| 4,513,442 | 4/1985 | Scherl | 382/49 |
| 4,516,265 | 5/1985 | Kizu et al. | 382/48 |
| 4,523,330 | 6/1985 | Cain | 382/7 |
| 4,524,453 | 6/1985 | Equami et al. | 382/1 |
| 4,528,692 | 7/1985 | Umeda et al. | 382/9 |
| 4,567,609 | 1/1986 | Metcalf | 382/9 |
| 4,603,390 | 7/1986 | Mehdipour et al. | 364/467 |
| 4,695,884 | 9/1987 | Anastassiou et al. | 382/51 |
| 4,817,166 | 3/1989 | Gonzalez et al. | 382/1 |

Primary Examiner—Leo H. Boudreau
Attorney, Agent, or Firm—J. K. Williamson; N. A. Nixson

[57] ABSTRACT

A license plate reader and method for reading the characters of a license plate and for identifying the state which issued the plate utilizes image intensity transition information gathered while scanning the plate. With the gathered intensity transition information, the plate image is identified and the license plate characters are extracted from the plate background with a relatively high degree of accuracy. A chopper isolates the region of the plate containing the character set for character-reading purposes and compensates for rivets in the plate and character appendages. A contour tracer is adapted to trace the exterior edges of each license plate character, and a tilt compensator compensates for the tilted condition of the characters when the plate is tilted relative to the horizontal. Furthermore, intensity transition patterns relating to decorative and non-decorative characteristics of the plate aid in the identification of the state which issued the plate, and an adjuster conforms, when necessary, the identity of an identified character so that the alphanumeric pattern conforms to an acceptable alphanumeric pattern of a plate of the identified plate-issuing state.

19 Claims, 4 Drawing Sheets

FIG. 4a ered difficult. Moreover, the existence of a decorative and vertically-oriented borderline adjacent the left or right edge of the plate may lead to an erroneous interpretation of the borderline as the numeral "1" or the letter "I".

Accordingly, it is an object of the present invention to provide a new and improved license plate reader and an associated method which circumvents difficulties involved in reading a license plate character set as a consequence of factors such as those described above.

Another object of the present invention is to provide such a reader and method for determining the background of the license plate with greater accuracy.

Still another object of the present invention is to provide such a reader and method for isolating the character region of the license plate with greater accuracy.

Yet another object of the present invention is to provide such a reader and method for isolating the character region of the license plate by compensating for rivets or the like which are partially contained within a plate character and by compensating for decorative borderlines positioned to the right and the left of the license plate character set.

A further object of the present invention is provide such a reader and method for isolating characters of the plate for interpretation by compensating for glare reflected from the plate.

A still further object of the present invention is to provide such a reader and method for isolating characters of the plate for interpretation by compensating for any canting of the plate and the characters thereof relative to the horizontal.

A yet still further object of the present invention is to provide an apparatus and method for identifying the state which issued the license plate with greater accuracy.

One more object of the present invention is to provide such a reader and method for interpreting characters of the license plate with greater accuracy.

Still one more object of the present invention is to provide such a reader and method for verifying the interpretation of the license plate characters with greater accuracy.

Yet one more object of the present invention is to provide such a reader and method for reading a license plate when the characters thereof are contained on two horizontal lines.

This invention resides in an improved apparatus for finding and identifying the characters of a license plate having a set of characters and a background region bordering each character, means for scanning the image and identifying a block of the image which is the image of the license plate, means for locating the edges of the license plate characters as a function of sensed image intensity changes as the license plate is scanned, means for tracing the contours of the edges of the characters, means for recognizing and identifying the characters of the license plate as a function of the traced contours, and means for recognizing and identifying the state which issued the license plate.

In one aspect of the apparatus of the present invention, the improvement comprises plate finding means associated with the image scanning means including a database containing criteria relating to the expected height of license plate characters contained within the produced image and means for scanning the character set in a columnar fashion. In this connection, the line scanning means is adapted to scan one-line-at-a-time for a predetermined distance across a portion of the license
APPARATUS AND METHOD FOR READING A LICENSE PLATE

FIELD OF THE INVENTION

The present invention relates to an apparatus and method for reading a license plate and more particularly relates to an improved apparatus and method for reading a license plate in which a license plate image is identified and verified using sets of predetermined criteria and then the license plate number and state logo are analyzed to read the number and identify the state.

BACKGROUND AND SUMMARY OF THE INVENTION

License plates carried by vehicles commonly bear an alphanumeric identification code commonly referred to as a license plate number and which is referred to herein as a license plate character set. Since each vehicle is uniquely identified by this number, it is widely used by law enforcement agencies and private concerns for the purpose of identifying vehicle ownership. Often, license plate numbers are stored in large data bases so that identification information associated with a particular number can be rapidly obtained.

Apparatus such as that described in co-pending patent application Ser. No. 859,639, filed May 5, 1986, now U.S. Pat. No. 4,817,166, entitled "Apparatus for Reading a License Plate", and having the same assignee as the present invention is capable of reading a license plate by converting the license plate number and name of the issuing state into digital form for use by a computer. Briefly, such an apparatus includes an imaging system for producing an image including the area of the license plate and processing means which scan the image and locate the region of the image which is the license plate. An extractor within the apparatus classifies the background as light or dark, and image scanning means scan the plate across a plurality of horizontal paths and senses the image intensity transitions along the scanned paths. Edge finder means utilize the sensed intensity transitions to locate the edges of the license plate characters. The edges are then traced by contour tracing means and each character is identified by identification means as the traced edges are compared to predetermined criteria contained within the database of the apparatus.

The apparatus such as aforedescribed is limited by certain factors relating to the nature of certain types of license plates or the reflectivity of the plate to light. For example, if the license plate characters are relatively thick, conventional methods of determining whether the background is light or dark may lead to erroneous background determinations if the license plate characters are relatively thick in comparison to the width of the plate. Furthermore, the heads of rivets or screws which may be partially contained within a license plate character may be responsible for an erroneous tracing of the edges of the character. Still further, glare reflected from the plate may lead to an erroneous interpretation as to the presence or location of a character edge. Yet still further, if the license plate is canted in relation to the horizontal so that the characters of the plate are canted, a proper identification of the license plate characters from the traced edges thereof is renplate character set from a location situated between the top and bottom boundaries of the license plate character set portion toward the top boundary thereof and moving one-line-at-a-time across the character set portion toward the bottom boundary thereof so that the character set is scanned generally upwardly and downwardly along one vertically-oriented column having a width which is about equal to the predetermined distance. The plate finding means further includes means for measuring at least one of the average gray level intensity and the gray level variance along each line scanned by the line scanning means. Sensing means contained within the plate finding means includes means for sensing at a location adjacent the top boundary of the character set a significant decrease in the measured one of the average gray level intensity and the gray level variance between one scanned line and another scanned line as the one and another lines are scanned in sequence and identifying the one scanned line as the top edge of the character set and for sensing at a location adjacent the bottom boundary of the character set a significant decrease in the measured one of the average gray level intensity and the gray level variance between two successively-scanned lines and identifying the first of the two successively-scanned lines as the bottom edge of the character set. The plate finding means further includes means for measuring the distance between the identified top and bottom edges of the character set and for comparing the measured distance to height criteria contained within the database to determine whether the measured distance corresponds to an expected height of the character set.

In another aspect of the apparatus of the present invention, background classifier means are associated with the edge locating means for classifying the background of the plate as light or dark. The background classifier means includes scanning means for scanning the plate one-line-at-a-time across lines extending generally horizontally across the license plate character set beginning at a location situated between the top and bottom boundaries of the character set and moving one-line-at-a-time toward one of the top and bottom boundaries of the character set. The background classifier means further includes measuring means for measuring the average gray level and the gray level variance along the scanned lines and sensing means for sensing a significant decrease in the measured gray level variance from one scanned line to another scanned line as the one and another lines are scanned in sequence. Averaging means is included in the classifier means for averaging the measured average gray level of preselected ones of lines scanned previously to the scanning of another scanned line to thereby obtain an averaged gray level, and comparing means are included for comparing the average gray level of the another scanned line with the averaged gray level and classifying the background according to whether the average gray level of another scanned line exceeds or is less than the averaged gray level to thereby obtain a background determination.

In still another aspect of the apparatus of the present invention, the apparatus includes line-scanning means associated with the edge-locating means for scanning the license plate along lines extending across the license plate character set and means for composing a gray level histogram of points contained in the license plate wherein the points include points of the lines scanned by the line-scanning means. Measuring means measures the area of the license plate image and calculates a threshold gray level value which a preselected percentage of the plate is higher than. Background classifier means classifies the background as light or dark, and interpreting means interprets as part of the license plate characters the regions of the license plate which have a gray level which is at least as high as the calculated threshold level when the background is classified as dark and for interpreting as part of the license plate characters the regions of the license plate which have a gray level which is lower than the calculated threshold when the background is classified is light.

In still another aspect of the apparatus of the present invention, the apparatus includes background classifier means for classifying the background of the plate as light or dark and the edge locating means is operatively connected to the background classifier means. With the use of a Laplacian operator, the edge locating means identifies, when the background is classified as dark, a selected portion of the edges of the characters which have a selected intensity level within the range of sensed edge intensity levels and is a selected percentage of the range of the background intensity level and for identifying, when the background is classified as light, a selected portion of the edges of the characters which have a selected intensity level within the range of sensed edge intensity levels and is a selected percentage of the range below the background intensity level. The contour tracing means of the apparatus is adapted to trace the contours of the characters along the identified portions of the edges.

In yet still another aspect of the apparatus of the present invention, the apparatus includes character alignment means for defining a straight baseline and a straight top line based on the lowermost and uppermost points of the characters, and detecting means are associated with the character alignment means for detecting the presence and location of intensity transitions along each of the baseline and top line that are nearest the left edge of the license plate and for detecting the presence and location of the intensity transition along each of the baseline and top line that are nearest the right edge of the license plate. The detecting means then joins each of the intensity transition locations detected adjacent the left edge of the license plate with an imaginary first line and joins each of the intensity transition locations detected adjacent the right edge of the license plate with an imaginary second line. The character alignment means is adapted to disregard license plate information sensed to the left of the imaginary first line and to disregard license plate information sensed to the right of the imaginary second line.

In a further aspect of the apparatus of the present invention, the apparatus includes character alignment means for defining a straight baseline and straight top line and for detecting the presence and location of an intensity transition along a low path extending parallel to and positioned adjacent and below the defined straight baseline and the existence and location of an intensity transition along a high path extending parallel to and positioned adjacent and above the defined top line. The apparatus also includes means for comparing the location of the detected intensity transition sensed along the low path with the location of the detected intensity transition sensed along the high path and determining whether the compared locations are positioned in a vertical relationship with one another. The contour tracing means of the apparatus is adapted to disregard license plate information below the baseline and above the top line when each of the compared locations is determined to be in a vertical relationship with respect to another of the compared locations and to disregard license plate information below the low path and above the high path when any of the the compared locations are determined not to be in a vertical relationship with any other compared location. Thus, when one compared location is determined not to be in a vertical relationship with any other compared location, at least a portion of the license plate region responsible for the intensity transition sensed along one of the high and low paths and at the one compared location is utilized in the identification of the license plate characters.

In a still further aspect of the present invention, the apparatus includes corner locating means associated with the edge locating means for identifying two left corners of the character set of the license plate wherein one of the left corners is contained along the defined baseline and the other of the left corners is contained along the defined top line and for identifying two right corners of the character set wherein one of the right corners is contained along the defined baseline and the other of the right corners is contained along the defined baseline. Joining means then joins the identified two left corners with a imaginary first line and joins the identified two right corners with an imaginary second line, and the contour tracing means for tracing the contours of the character edges is adapted to follow what would otherwise be a vertical edge of a character along a path which is generally parallel to one of the imaginary first and second lines.

In a yet further aspect of the apparatus of the present invention, the apparatus is adapted to read the characters of a license plate arranged in two superposed rows in the plate. In this connection, the apparatus includes a database containing criteria related to expected heights of license plates as a function of the length of the license plate character set and a scanner for scanning the license plate from one of the bottom and top of the plate toward the other of the bottom and top of the plate and through a first row of license plate characters. Measuring means in the apparatus measures the height and length of the first row of license plate characters scanned by the scanner, and comparing means compares the height of the first row of characters with the plate-height criteria of the database to determine whether the height of the first row of characters corresponds with the expected height of a license plate having a character set length equal to about the measured length of the first row of license plate characters. The scanner of the apparatus is adapted to continue scanning from the first row of license plate characters toward the other of the bottom and top of the plate for sensing the presence of intensity transitions associated with a second row of license plate characters when the comparing means determines that the height of the first row of characters does not correspond with an expected height of a license plate having a character set length equal to about the sensed length of the first row of license plate characters. The locating means of the apparatus is adapted to locate the edges of the characters in each row of characters found in the license plate as a function of the intensity transitions sensed in connection with each row, the tracing means is adapted to trace the contours of the located edges of the characters in each row, and the recognizing and identifying means is adapted to recognize and identify the characters in each row of license plate characters.

In one more aspect of the apparatus of the present invention, the apparatus includes state recognition means for sensing intensity transition patterns relating to decorative characteristics of the license plate and means for recognizing and identifying the state which issued the plate as a function of the sensed transition patterns.

In one more further aspect of the apparatus of the present invention, the apparatus includes state recognition means for sensing intensity transition patterns relating to non-decorative characteristics of the plate, which characteristics aid in the identification of the state which issued the plate, and means for recognizing and identifying the state which issued the license plate as a function of the sensed transition patterns.

In yet one more aspect of the apparatus of the present invention, the apparatus includes a database containing criteria relating to alphanumeric patterns of license plate character sets of plates issued by the identified state. The apparatus further includes means for comparing the alphanumeric pattern of the set of the identified characters to the alphanumeric patterns contained in the database and changing the identification of selected ones of the characters to conform the alphanumeric pattern of the set of identified characters to one conforming to an alphanumeric pattern of a character set issued by the identified state when the alphanumeric pattern of the set of the identified characters does not match an alphanumeric pattern contained in the database.

The method of the present invention includes the steps performed by the apparatus of the present invention. Accordingly, the method includes various aspects corresponding with the steps performed in accordance with the aforementioned aspects of the apparatus of the present invention.

BRIEF DESCRIPTION OF THE DRAWINGS

The present invention may be best understood by reference to the following Detailed Description of Preferred Embodiments when considered in conjunction with the Drawings in which.

DETAILED DESCRIPTION OF PREFERRED EMBODIMENTS

Figure 1:
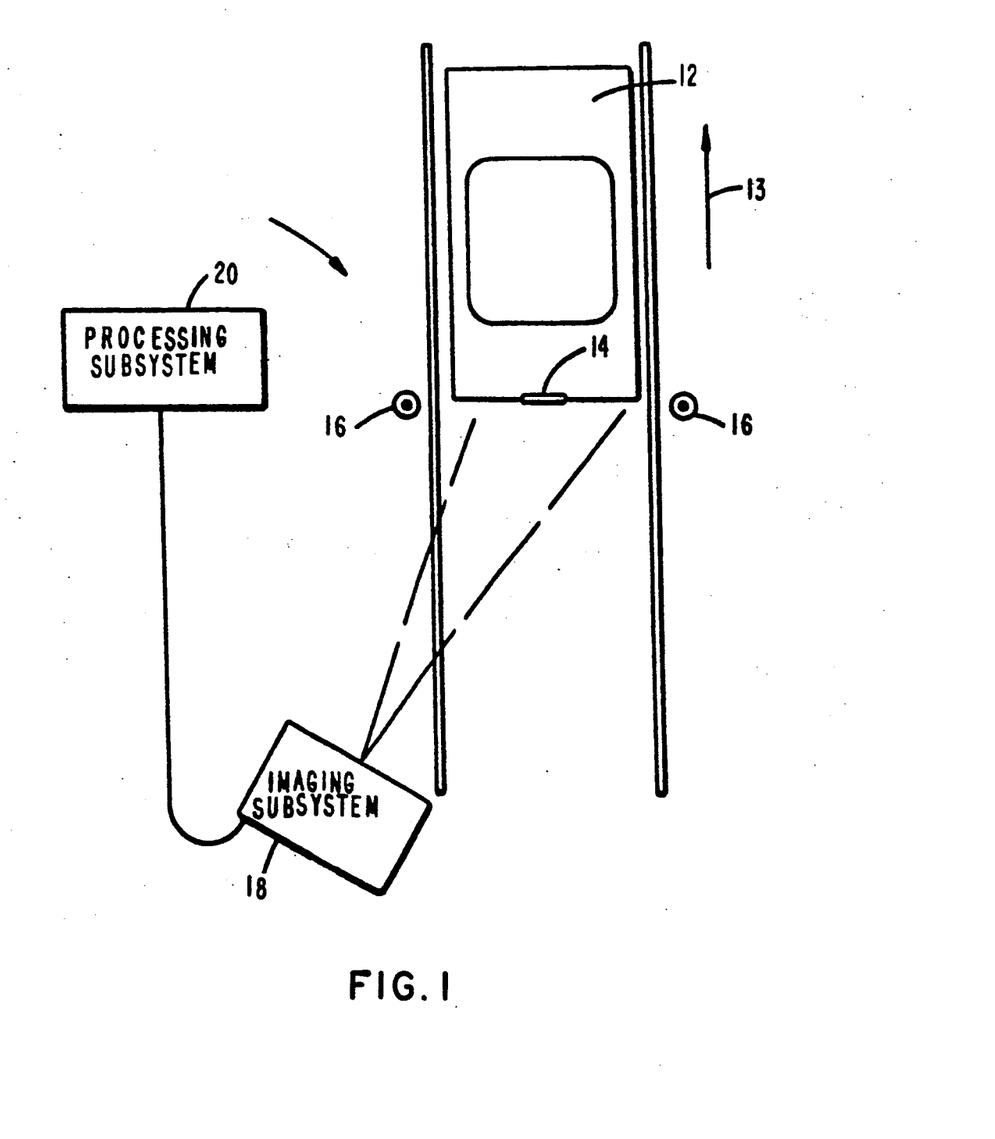
FIG. 1 is a schematic plan diagram of the license plate reader in the process of reading a license plate on a vehicle.

Referring now to the drawings in which like reference characters designate like or corresponding parts throughout the several views, there is shown in FIG. 1 a schematic plan overview of an embodiment of the license plate reader in accordance with the present invention and generally indicated 10 and a vehicle 12 having a license plate 14 which the license plate reader 10 is adapted to read. The vehicle 12 is shown traveling in the direction indicated by arrow 13, and the license plate 14 is affixed centrally of the rear portion of the vehicle 12. The vehicle sensor 16 positioned on opposite sides of the roadway detect the presence and then the absence of the vehicle 12 and activate the imaging subsystem 18 to view the rear of the vehicle 12 and produce an image thereof. The image of the vehicle 12 and the license plate 14 are then fed from the imaging subsystem 18 to a processing subsystem 20 which locates and reads the license plate 14.

Figure 2:
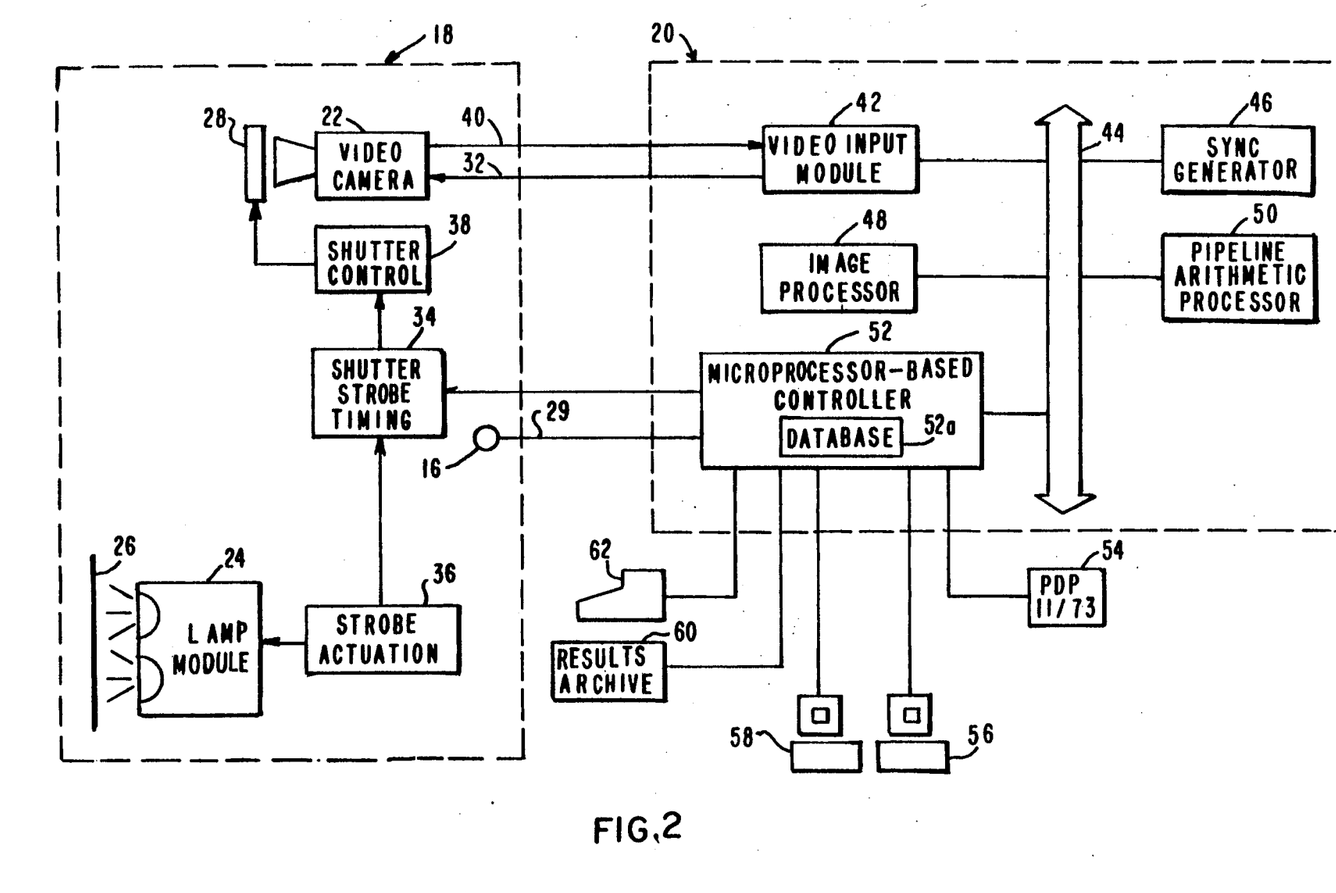
FIG. 2 is a schematic diagram of the license plate reader showing the imagining system and the apparatus for processing the image system and the apparatus for processing the image to determine the license plate character set.

With reference to FIG. 2, the imaging subsystem 18 includes a video camera 22 which is focused on the license plate 14 and a lamp module 24 that illuminates the license plate 14 through a polarizer 26. The video camera 22 includes an electronic shutter 28 that is polarized when opened, and the open shutter 28 is cross-polarized with respect to the polarizer 26.

To initiate the imaging process and with reference still to FIG. 2, subsystem 18 is actuated by signals appearing on lines 30 and 32 which originate from the processing subsystem 20. When the sensor 16 (FIG. 1) detects the presence, then the absence, of the vehicle 12, the rear of the vehicle 12 is properly positioned, the subsystem 20 is appropriately signaled along line 29 and an actuation signal is produced on line 30 (FIG. 2). The signal on line 30 is received by a shutter/strobe timing circuit 34 which applies a signal to a strobe actuation circuit 36 and a shutter control circuit 38. The actuation circuit 36 actuates the lamp module 24 and causes it to flash. At the same time, or very shortly thereafter, the shutter control 38 opens and closes the electronic shutter 28 for a duration of about 1/10,000 second during the period of the flash from the lamp module 24. An initiating signal appearing on line 32 is provided to the video camera 22 by the processing subsystem 20 which causes it to begin scanning a new frame just prior to the flash from lamp module 24 and just prior to the opening of the electronic shutter 28.

The image that is captured by the video camera 22 is transmitted by line 40 to a video input module 42 of the processing subsystem 20. This image is then transmitted from the module 42 to a data bus 44 which is also connected to a sync generator 46, an image memory and processing subsystem processor 50, and a microprocessor base controller 52. In the preferred embodiment, the image memory and processing subsystem 48 is a Perceptics IP-920 Processor/Image Memory System. The IP-920 may also be connected with an exterior computer 54 and a maintenance/start-up terminal 58 integrated with a Motorola 68020. The controller 52 may also be interconnected with an exterior computer 54 which, in turn, can interconnect with an operator in/out terminal 56, a results archive 60, and a hard copy printer 62. Once the image of a rear of a vehicle is captured in the image memory 48, it is operated upon by the processor 54 and by the controller 52 to locate the license plate 14 and then read it.

Figure 3:
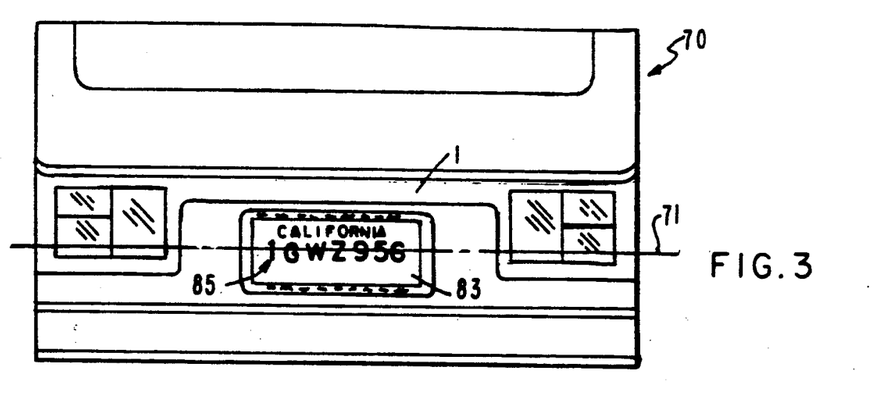
FIG. 3 is an image of the rear of a vehicle in the area of a license plate.
Figure 4:
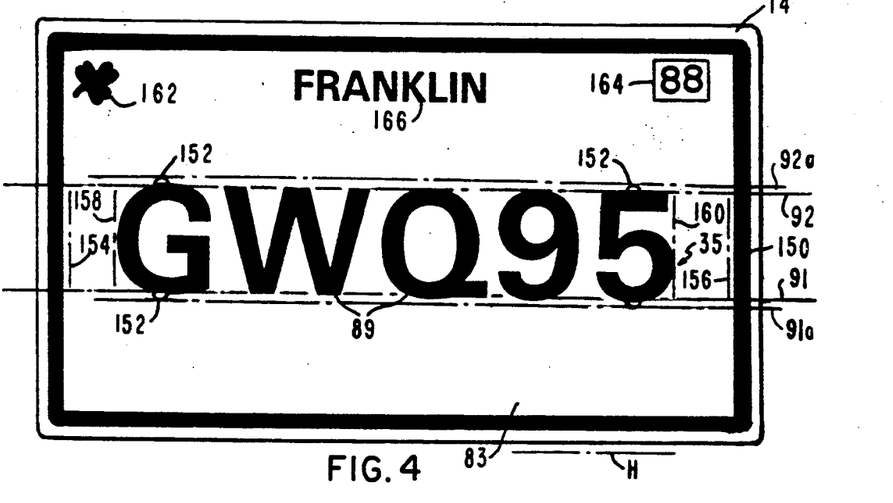
FIG. 4 is an image of the representative license plate mounted upon the vehicle of FIG. 3.
Figure 5:
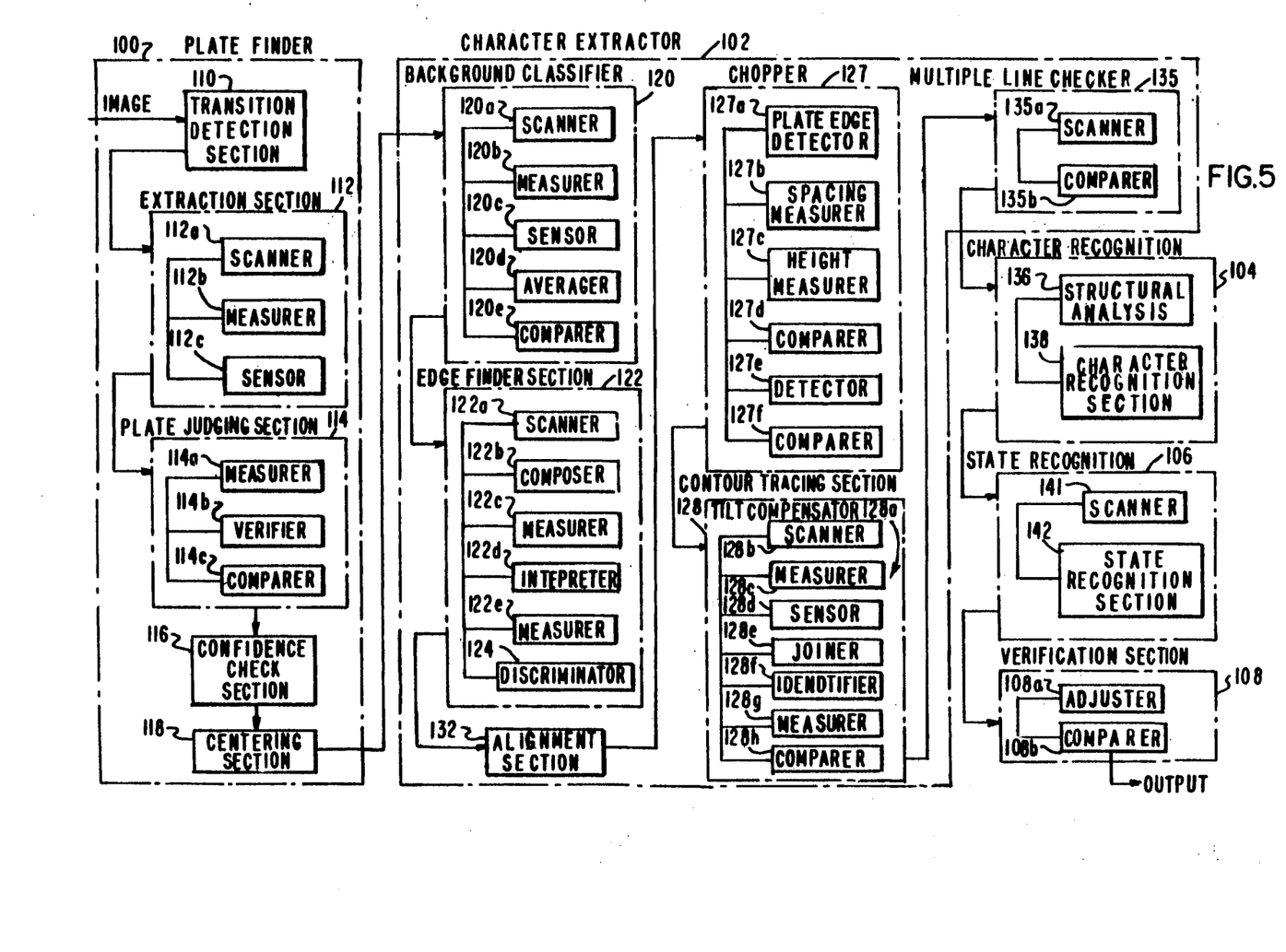
FIG. 5 is a block diagram showing one embodiment of the license plate reader.

The operation of the processor 20 may best be understood with reference to the operational block diagram shown in FIG. 5 when considered in conjunction with FIG. 3, an image of the rear of a vehicle, and FIG. 4, an image of a license plate 14. Referring to FIG. 5, the license plate reader 10 includes a plate finder section 100 which operates on the image 70 such as that shown in FIG. 3 to find the license plate 12. When the license plate 12 is located, this information is transferred to the character extraction section 102 which finds the license plate characters 89 (FIG. 4) and the contours thereof. Each character 89 is then recognized by the character recognition section 104 and afterwards the state or country issuing the plate 14 is determined by a state recognition section 106. The final operation is performed by a verification section 108 which utilizes information relating to the peculiar characteristics of each state's license plates to reread and verify that the license plate characters 89 have been correctly identified.

The plate finder 100 includes a transition detection section 110 that looks for transitions meeting a frequency criteria that would indicate that a license plate character set 85 may have been encountered. The technique is best understood by reference to a horizontal scan line 71 shown in FIG. 3 crossing the license plate character set 85. It will be appreciated that the frequency of image intensity transitions on the image 70 occurs rather rapidly as the scan line 71 crosses the character set 85. That is, the image intensity level begins to change rapidly between light and dark as the scan line 71 passes between the characters 89 (FIG. 4) and the license plate background 83. The intensity transitions caused by the character/background interface 89 will vary depending upon the size of the characters on different license plates 14, the spacing between the characters 89, the type of numeral or letter that is used on the license plate 14 and the image gray level of the characters 89 and the background 83 surrounding each of the characters 89. Also, the intensity transition frequency may vary depending upon the angle at which the license plate 14 is viewed by the imaging subsystem 18, and the size of the image of the license plate 14. The image size of the license plate 14 will depend upon the distance of the license plate 14 from the imaging subsystem 18 and any magnification thereof, either optically or electronically. In the transition detection section 110, a number of criteria could be devised for determining whether the detected intensity transitions correspond to a license plate character set, but in the depicted embodiment 10, the section 110 looks for a particular size pulse in terms of duration (pixel length) and looks for a minimum number of such pulses within a given window on a scan line. As a scan crosses part of a character 89, a pulse having a length in the range of 4 to 24 pixels is produced and it is assumed that any license plate character set will create six to eighteen such pulses in a scan length (window) of at least 112 pixels. These are the criteria used in the depicted embodiment 10.

As the transition detection section 110 identifies windows that meet the predetermined frequency criteria, a transition block extraction section 112 will extract a block from the image that meets the transition frequency criteria. Assuming that the license plate character set 85 is the subject of a scan interrogation, the block identified by the transition block extraction section 112 will have a height equal to the character height of the license character set 85 and will have a length equal to the string length of the character set 85. Hence, the block identified by the extraction section 112 is a block suspected to be a license plate number.

Figure 4A:
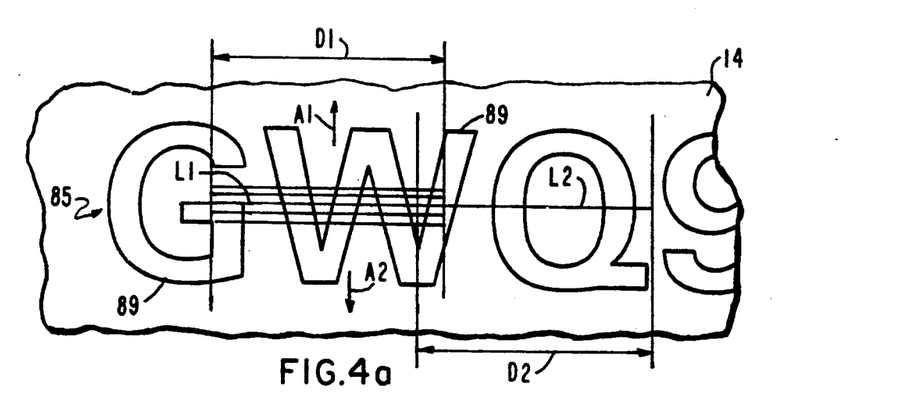
FIG. 4a is a view of a fragment of the plate of FIG. 4 drawn to a slightly larger scale.

The transition block extraction section 112 selects a block of the image which may correspond to a license plate character set 85 by first looking for windows corresponding to an expected height of license plate characters contained within the produced image. To this end, there is contained within the controller 52 a database 52a containing criteria relating to the expected sized (e.g., heights and widths) of license plate characters and character sets contained within the produced image. To determine the height of the character set 85 and with reference to FIG. 4a, the extraction section 112 scans the character set 35 in a columnar fashion while looking for transition frequency characteristics which meet predetermined criteria. More specifically, the extraction section 112 includes scanning means 112a for scanning on-line-at-a-time for a predetermined distance, indicated D1 in FIG. 4a, across a portion of the license plate character set 85 from a location, indicated L1, situated between the top and bottom boundries of the set 85 and moving one-line-at-a-time across the character set portion generally toward the top boundary of the character set 85 as indicated by the arrow A1 and generally toward the bottom boundary of the character 85 as indicated by the arrow A2. Hence, the license plate character set 85 is scanned generally upwardly and downwardly along one vertically-oriented column having a width which is about equal to the predetermined distance D1. The location L1 at which the scanning means 112a begins to scan is selected by the extraction section 112 as a location within the block region at which the transition frequency criteria are met and can be any such location situated between the top and bottom boundry and the left and right edges of the character set 85. With reference again to FIG. 5, the extraction section 112 includes measuring means 112b for measuring the average gray level intensity and the gray level variance along each scanned line, and sensing means 112c associated with the measuring means 112b is adapted to sense both of a significant decrease in average gray level intensity and the gray level variance measured by the measuring means 112a between two successively-scanned lines. In practice, such a significant decrease in average gray level intensity or gray level variance normally occurs as the scanning means 112a crosses the top and bottom boundries of the character set 35 in its upwardly and downwardly scanning operation. Hence, the first of the two successively-scanned lines between which such a decrease is sensed is correspondingly identified as the top or bottom edge of the character set 85.

To ensure that the scanning means 112a does not scan a vertical column through the character set 85 which lies totally between the characters 83, the scanning means 112a is adapted to scan across the vertically-oriented column a distance which is at least as great as the width of a license plate character expected to be encountered within the produced image and less than the width of the license plate character set expected to be encountered within the produced image. To this end, a range of differences in expected width between the license plate character set and one license plate character are contained within the database 52a of the controller 52, and the distance across which the portion of the character set 85 is scanned by the scanning means 112a is limited by the controller 52 to a distance contained within such a range of differences.

Once the top and bottom edges of the character set 85 are identified and the reference still of FIG. 5, plate judging section 114 judges the block to determine whether it is a license plate character set. In this connection, the license plate character set 85, or an image thereof, will have a predetermined height which falls within a predetermined range, and such a predetermined range is contained within the database 52a of the controller 52 as mentioned earlier. The plate judging section 114 includes measuring means 114a for measuring the distance between the identified top and bottom edges of the character set 85 and comparing the measured distance, or height, to the height criteria contained within the database 52a to determine whether the measured height corresponds to the expected height of the character set 85. If the measured distance corresponds to the expected height of the character set 85, the plate judging section 114 makes a first determination that the suspected block is in fact the license plate character set.

In accordance with the present invention, the plate judging section 114 further includes verification means 114b for confirming that the image of the license plate 14 is contained within the identified image block. Such verification means 114b includes means associated with the transition block extraction section 112 for continuing the columnar scan of the character set 85 across the plate 14 and obtaining measurement data relating to the character set 85. In operation, the verification means 114b sends appropriate command signals to the scanning means 112a so that a second vertically-oriented column located adjacent and in overlapping relationship with the first column is scanned. More specifically and with reference again to FIG. 4a, the scanning means 112 scans one-line-at-a-time for a predetermined distance D2 across a second portion of the license plate character set 85 from a location L2 situated between the top and bottom boundries of the license plate character set and moving one-line-at-a-time across the second character set portion toward the top boundry of the character set and moving one-line-at-a-time across another character set portion toward the bottom boundry of the character set 85. Hence, the license plate character set 85 is scanned generally upwardly and downwardly along a second vertically-oriented column wherein the column first scanned by the scanning means 112 and the second column are disposed in overlapping relationship.

Along each line scanned in the second column, the average gray level intensity and the gray level variance are measured by the measuring means 112b, and the sensing means 112c is adapted to sense a significant decrease in one of an average gray level intensity and the gray level variance between two successfully-scanned lines to thereby identify the top and bottom edges of the character set in accordance with the locations adjacent the top and bottom boundries of the character set 85 at which the significant decrease in average gray level intensity or the gray level variance is sensed. The measuring means 114a then measures the distance between the identified top and bottom edges of the character set identified in the second-scanned column, and comparing means 114c associated with the verification means 114b compares the or height of the character set measured in the second-scanned column to the height of the character set as measured in the previously-scanned column to determine whether the measured heights correspond to one another. If such measured heights correspond with one another, then the plate judging section 114 makes a second determination that the selected block is in fact a license plate character set.

In the depicted embodiment 10, the verification means 114b measures the height of the character set in each column in a series of overlapping columns as such columns are scanned toward the right and to the left of the first column scanned by the scanning means 112a.

Each measured height is compared with the measured height of the previously-scanned column to check for a match therebetween, and the plate 14 is continued to be scanned rightwardly and leftwardly in a columnar fashion until two consecutively-scanned columns are found which do not reflect a character height which corresponds to the height measured in a previously-scanned column. Characteristically, such columns which do not reflect a character height which conforms to the character height of a previously-scanned column does not contain a character 89 of the set 85. Hence, the finding of two consecutive non-conforming columns adjacent the right and left side edges of the plate 14 signify the right and left side edges of the character set 85 has been reached, and the plate judging section 114 categorizes or identifies a vertical edge of the first-scanned of each of the consecutive non-conforming columns on each side of the plate as the left and right edges of the character set 85.

In further accordance with the present invention, the verification means 114b cooperates with the measuring means 114a and comparing means 114c to verify that the width of the selected block is within the range of expected widths of license plate character sets. In this connection, the measuring means 114a measures the distance sensed between the right and left edges of the license plate character set 85 as identified by the plate judging section 114 and the comparing means 114c compares the measured width to the width criteria contained on the database 52a to determine whether the measured width falls within a range of expected license plate character set widths. If the measured width falls within the range of expected widths, the plate judging section 114 makes a further determination that the selected block is in fact a license plate character set.

A confidence check section 116 double checks the plate judging section 114 by scanning above and below the suspected license plate character set 85. This scan is done to check for state logos, such as logo 84 shown in FIG. 4, which will usually appear above or below the license plate character set 85 in a predetermined location. By scanning the predetermined locations, the confidence check section 116 determines whether or not a logo 84 is properly positioned with respect to the suspected license plate character set 85. In the preferred embodiment, the logo 84 is identified by frequency of intensity transition criteria. Since the logo 84 is usually depicted with letters smaller than those of the character set 85, it is necessary to use a different criteria of transition frequency than that used to locate the character set 85. In this connection, the confidence check section 116 scans for a selected number of gaps between letters in a predetermined window. That is, the section 116 looks for pulses having an intensity level equal to the background intensity, having a pulse length of one to four pixels with seven pulses in fifty-six pixels. Furthermore, the confidence check section 116 scans a window that is about fifty-six pixels long that is located from about ten to eighteen pixels above the top of the license plate number 85 and from about ten to eighteen pixels below the bottom of the license plate character set 85. The locations mentioned above are the predetermined locations where the logo 84 is expected to be found and the window is the size range within which a logo 84 must fall. If a suspected logo is larger than the window, it is rejected as a logo.

Following the operation of the confidence check section 118, the center of the license plate character set 85 is found by a centering section 118. In operation, the centering section 118 utilizes information gathered as the plate 14 is scanned by the scanning means 112a and identifies the furthest points, or the outwardmost points on each line scanned. It then averages the furthest points and calculates the center of the license plate character set 85 in the horizontal direction. For a more complete description of the centering section 118, reference may be had to co-pending patent application Ser. No. 859,639, filed May 5, 1986, and entitled "Apparatus For Reading A License Plate" and incorporated herein by reference.

With reference still to FIG. 5, the first section of the character extractor 102 is a background classifier section 120 that determines whether the background 83 of the license plate 14 is light or dark. In accordance with the present invention, the background classifier section 120 includes scanning means 120a for scanning the license plate one-line-at-a-time across lines extending generally horizontally across the license plate character set 85 beginning at a location situated between the top and bottom boundries of the license plate character set 85 and moving one-line-at-a-time toward each of the top and bottom boundries of the character set 85. Measuring means 120b associated with the scanning means 120a measures the average gray level and the gray level variance along each of the scanned lines, and sensing means 120c senses a significant decrease in the measured gray level variance between two successively-scanned lines as the scanning means 120a scans across the top and bottom edges of the character set 85. Averaging means 120d associated with the sensing means 120a averages the measured gray levels of preselected ones of lines scanned previously to the scanning of the second of the successively-scanned lines (i.e., the line responsible for the sensed decrease in average gray level variance) to thereby obtain an averaged gray level. In the depicted embodiment 10, the averaging means 120d averages the gray levels of three lines scanned immediately prior to the second of the successively-scanned lines. Comparing means 120e associated with the averaging means 120d compares the average gray level of the second of the sequentially-scanned lines scanned lines with the averaged gray level (of the prior three lines) and classifying the background 83 according to whether the average gray level of the second of the successively-scanned lines exceeds or is less than the averaged gray level to thereby obtain a background determination. In the depicted embodiment 10, if the average gray level of the second of the successively-scanned lines is higher than the averaged gray level, the background is determined to be light. Conversely, if the average gray level of the second of the successively-scanned lines is lower than the averaged gray level, the background is determined to be dark.

In accordance with the present invention, the background classifier section 120 determines or classifies the background of the license plate 14 as light or dark as each of the top and bottom boundaries of the character set 85 are crossed by the scan lines generated by the scanning means 120a. The two background determinations are then compared with one another by the comparing mean 120e to determine whether the background determination made at the top and bottom boundries of the character set 85 match one another. If the aforedescribed background determinations match, the background is presumed to be classified correctly. If, on the other hand, the aforedescribed background determinations do not match, then an alternative procedure for classifying the background is followed.

More specifically, the alternative procedure for determining whether the background 83 is light or dark involves a looking by the background classifier section 120 at a histogram of the intensity levels over a selected area of the image which includes the license plate character set 85. This selected area is chosen to be the same size or greater than the size of the number 85, but smaller than the expected size of the license plate 12. Assuming that a dark area has a lower level of intensity than a light area, if the median intensity is less than average intensity, then the background 83 is determined to be light. On the other hand, if the median intensity level is greater than the average intensity level, then the background 83 is determined to be dark.

Once the background is classified and with reference again to FIG..5, the edge finder section 122 of the character extractor 102 distinguishes the areas or regions of the plate 14 are part of the license plate characters 89 from the background 83. To this end, the edge finder section 122 includes scanning means 122a for scanning the plate along lines extending across the license plate character set 85 and composing means 122b associated with the scanning means 122a for composing a gray level histogram of points contained in the license plate as the plate 14 is scanned by the scanning means 122a. Measuring means 122c are appropriately connected to the composing means 122b for measuring the area of the block of the license plate image and for calculating a threshold gray level value which a preselected percentage of the measured plate area is higher than, and interpreting means 122d associated with the measuring means 122c interprets for consideration the portions of the license plate which either have a gray level which is at least as high as the calculated threshold level or is no higher than the threshold value. In the preferred embodiment 10, the threshold gray level value is calculated to be the gray level value which about ten percent of the plate is higher than, and such a calculation is believed to circumvent problems which may otherwise arise due to the reflection of glare off areas of the license plate 14.

Once the threshold value is calculated, the interpreting means 122d utilizes the background determination as determined by the background classifier 120 to distinguish the license plate characters 89 from the remainder of the plate. More specifically, when the background 83 is classified as dark, the interpreting means 122d interprets as part of the license plate characters 89 the regions of the license plate which have a gray level at least as high as the calculated threshold level. Conversely, when the background 83 is classified as light, the interpreting means 122d interprets as part of the license plate characters 89 the regions of the license plate which have a gray level which is no higher than the calculated threshold level.

Upon distinguishing the license plate characters 89 from the remainder of the plate 14, the edge finder means 122 used a Laplacian operator for locating the exterior portion of the edges of the characters 89 wherein the exterior portion is defined as that portion of the edge that is farthest from the main area of the character 89. In this connection, the edge finder means 122 includes measuring means 122e for measuring the range of character edges and identifies, by means of an edge discriminator section 124, the exterior portion of each character 89 as a function of whether the background 83 is classified as light or dark. More specifically and when the background 83 is classified as dark, the edge discriminator section 124 identifies the portion of the character edges which have a selected intensity level within the range of edge intensity level and is a selected percentage of the range of the background intensity level. When the background 83 is classified as light, the edge discriminator section 124 identifies the portion of the character edges which have a selected intensity level within the edge intensity levels and is a selected percentage of the range below the background intensity level.

In further accordance with the present invention, the character extractor 102 includes chop means 127 for effectively removing from the license plate image extemporaneous matter which may otherwise be interpreted by the reader 10 to be a character 89 of the character set 85 or part of a character 89 within the set 85. Such chop means 127 may be best understood with reference t FIG. 4 in which license plate 14 is shown as including a decorative border 150 extending along the top and bottom and left and right edges of the plate 14 and wherein the license plate 14 is operatively attached to the vehicle 12 by means of rivets 152 which intersect the edges of selected ones of the characters 89. In order that no portion of the decorative border 150 or, and more particularly, no portion of the decorative border 150 positioned at the left and right edges of the plate 14 is interpreted as the numeral "1" or letter "I" and so that the likelihood is lessened that the outline of the rivets 152 will contribute to a tracing of a character outline which cannot be identified by the reader 10, the chop means 127 operates to chop the decorative border 150 and the rivets 152 from the license plate image when preselected criteria are satisfied so that information borne by the license plate 14 outside of the top, bottom and left and right boundries of the character set 85 are disregarded for reading purposes.

In this connection and with reference to FIGS. 4 and 5, the character extractor section 102 includes a character alignment section 132 cooperating with the chop means 127 for defining a straight baseline 91 (FIG. 4) and a straight top line 92 (FIG. 4) based upon the bulk of the lowermost and uppermost points of the characters. Basically, the top line 92 and baseline 91 are determined by finding the uppermost and lowermost points of each character contour and fitting the best straight lines through such points, but for a more detailed description of the method by which the character alignment section 132 finds the baseline 91 and top line 92, reference may be had to co-pending patent application Ser. No. 859,639, filed May 5, 1986, whose disclosure is incorporated herein by reference.

In accordance with the present invention, the chop means 127 includes detecting means 127a appropriately connected to the character alignment section 132 for detecting the presence and location of the intensity transitions along each of the baseline 91 and top line 92 that ar nearest the left edge of the license plate 14 and for detecting the presence and location of the intensity transition along each of the baseline 91 and top line 92 that are nearest the right edge of the license plate 14 and for joining each of the intensity transition locations detected adjacent the left edge of the license plate with one another with an imaginary first line, indicated 154 in FIG. 4, and for joining each of the intensity transition locations detected adjacent the right edge of the license plate with one another with an imaginary second line, indicated 156 in FIG. 4. In this connection, the detecting means 127a utilizes information collected concerning the intensity transitions as the license plate is scanned by the scanning means 120a so that the detecting means 127a identifies the aforedescribed edge locations from information which has previously been collected. During a plate-reading operation of the reader 10 and as is apparent herein, the character recognition section 110 is adapted to disregard license plate information sensed to the left of the first imaginary line 154 and to disregard license plate information sensed to the right of the second imaginary line. Hence, the detecting means 127a effectively chops information away from the character set 85 image which information may include a borderline 150 adjacent the edge of the license plate and which has portions positioned to the left and to the right of the character set 85 which may otherwise be erroneously interpreted by the reader 10 as a numeral "1" or letter "I" of the character set.

In accordance with the present invention and for reducing the likelihood that the left and right edges of the character set 85 have been improperly identified, the database 52a (FIG. 2) contains preprogrammed criteria relating to an expected width of a license plate character set as a function of the height of the license plate character set 85. Furthermore, and with reference again to FIGS. 4 and 5, the chop means 127 includes means 127b for measuring the spacing between the imaginary first and second lines 154 and 156, means 127c for measuring the height of the character set 85 and means 127d for comparing the detected locations of the left and right edges of the character set 85 to the side width criteria contained within the database 52a for verifying that the measured spacing between the first and second lines 154 and 156 corresponds with an expected width of a character set. Therefore, with knowledge contained within the database 52a as to the expected width of a character set, the chop means 127 is not likely to interpret the left and right edges of the character set 85 at locations contained inboard of the actual left and right edges of the set 85 or at locations situated outboard of the left and right edges of the plate 14.

In further accordance with the present invention, the chop means 127 operates to adjust the amount of license plate information blocked out for character-reading purposes as a function of information detected above and below the top line 92 and baseline 91, respectively. To this end and with reference to FIGS. 4 and 5, the chop means 127 includes detecting means 127e for detecting the presence and location of an intensity transition along a low path, indicated 91a in FIG. 4, extending parallel to and positioned adjacent and below the defined straight baseline 91 and the existence and location of an intensity transition as measured along a high path, indicated 92a in FIG. 4, extending parallel to and positioned adjacent and above the defined top line 92. In the license plate 14 of FIG. 4, such intensity transitions along the low path 91a are detected by the detecting means 132a at the site of the two lowermost rivets 152 and the appendage or tail of the letter "Q" of the character set 85. Similarly, such intensity transitions along the high path 92a are detected at the site of the two uppermost rivets 152.

With reference again to FIG. 5, the chop means 127 further includes comparing means 127f for comparing the location of each intensity transition sensed along the low path 91a with the location of each intensity transition sensed along the top path 92a and determining whether the compared locations are positioned in a generally vertical relationship with respect to one another. When any of the sensed intensity transition locations compared by the comparing means 127f are determined to be not positioned in a vertical relationship with one another, the license plate information sensed below low path 91a and above the top path 92b is blocked out for character reading purposes. If, on the other hand, the comparing means 127f determines that each of the compared locations is in a vertical relationship with another one of the compared locations, license plate information sensed below the baseline 91 and above the top line 92 is blocked out for character-reading purposes.

It follows from the above-described operation of the chop means 127 that the size of the region of information extracted for character-reading purposes is adjusted if any intensity transition location sensed along the low or high paths 91a or 92b does not have a counterpart intensity transition location positioned along the other high or low paths 92a or 91a. Thus, portions of license plate characters, such as the tail of the letter "Q", which would be normally responsible for the sensing of an intensity transition along the low path 91a and which may otherwise be blocked out below the baseline 91 for character-reading purposes is instead included in the region of the plate 14 utilized for character-reading purposes. Hence, the chop means 127 is believed to enhance the accuracy of subsequent identification of the characters 89.

While in the illustrated plate 14 of FIG. 4, the tail of the letter "Q" provides no sensed counterpart intensity transition along the high path 92b, each rivet 152 responsible for an intensity transition sensed along one of the high and low paths 92a and 91a is positioned opposite a rivet 152 responsible for providing an intensity transition sensed along the opposite high or low path 91a or 92a. Therefore, if in the case of the exemplary license plate 14 of FIG. 4, the rivets 152 were all that were responsible for the intensity transitions sensed along the high and low paths (e.g., if the character set 85 did not include the letter "Q"), the region of license plate information used for subsequent character-reading purposes would be limited to the region defined between the baseline 91 and top line 92.

Using the information gathered regarding the exterior edges of the characters 89 and the region of license plate information identified, the contour tracing section 128 traces the contour of each character 89. In the depicted embodiment 10, contour tracing is done by examining a three pixel by three pixel neighborhood of a subject pixel. In order to be a pixel on a contour, at least one of the eight surrounding pixels must be a background point as determined by the threshold intensity level wherein the threshold level is calculated to be the majority gray level of the exterior portion of the character edges.

Inasmuch as the contours of the traced characters 89 are compared to criteria contained or programmed within the database 52 in a manner described herein for the purpose of identifying the characters 89, a tilted license plate may lead to difficulties in character identification. In this connection, the contours of characters contained within the database 52a include vertical edges where one would normally expect a character edge to be vertical. A tilted license plate, however, orients the vertical edges of its characters in a tilted condition so that the traced contour of a tilted character may be difficult to match with database criteria. To compensate for a tilting of the license plate 14 relative to the horizontal, the contour tracing section 128 includes tilt compensating means 128a adjusting the traced contour in accordance with the tilt or slope of the license plate 14 relative to the horizontal.

The operation of the tilt compensating means 128a is best understood with reference to FIG. 4 in which the license plate 14 is illustrated in a tilted condition with respect to the horizontal H and FIG. 5. The tilt compensating means 128a includes scanning means 128b for scanning one-line-at-a-time along lines extending generally vertically across the character set 85 beginning at a predetermined location between the right and left boundaries of the license plate character set 85 and moving one-line-at-a-time toward each of the right and left boundaries of the character set 85. Measuring means 128c measures the gray level variance along the vertically-scanned lines, and sensing means 128d senses a significant decrease in gray level variance on the right side of the license plate character set from one generally vertically-scanned line to another generally vertically-scanned line and for sensing a significant decrease in gray level variance on the left side of the license plate character set from a first generally vertically-scanned line to a second generally vertically scanned line.

At the site along the left side of the character set 85 at which the significant decrease in gray level variance is sensed, joining means 128e join the baseline 91 and top line 92 with an imaginary first line 158 oriented generally at a right angle with each of the baseline 91 and top line 92. Identifier means 128f identifies the points at which the imaginary first line 158 intersects the baseline 91 and top line 92 as the lower and upper corners, respectively, of the character set 85 situated on the left side of the set 85. Similarly and at the site along the right side of the character set 85 at which the significant decrease in gray level variance is sensed, the joining means 128e joins the baseline 91 and top line 92 with an imaginary second line 160 oriented generally at a right angle with each of the baseline 91 and top line 92, and the identifier means 128f identifies the points at which the imaginary second line 160 intersects the baseline 91 and top line 92 as the lower and upper corners, respectively, of the character set 85 situated on the right side of the set. It will be understood that because the baseline 91 and top line 92 may not be parallel in every plate read by the reader 10, the slope of the baseline 91 and top line 92 are averaged by the joining means 128e so that the imaginary first and second lines 158 and 160 are formed at right angles to an imaginary line extending across the plate and possessing the average slope of the baseline 91 and top line 92.

Once the first and second imaginary lines 158 and 160 are formed, the contour tracing means utilizes the slope of the imaginary lines 158 and 160 for tracing or following what would otherwise be considered as a vertical edge of a character 89 along a path which is generally parallel to one of the imaginary first and second lines 158 and 160 for subsequent consideration of the traced path as a vertical edge. Thus by considering the edges of the characters 89 which would be vertical if not for the tilted condition of the license plate 14 as vertical edges, the traced contours of the characters 89 are likely to be easier to match with the appropriate character criteria contained on the controller database 52a, and the tilt compensating means 128a is believed to be advantageous in this regard.

To ensure that the formed first and second imaginary lines 158, 160 are not formulated generally between characters 89 of the set 85, measuring means 128g are included in the tilt compensating means 128g for measuring the height of the character set 85 corresponding to the distance between the baseline 91 and top line 92 and for measuring the width of the set 85 corresponding to the spacing between the first and second imaginary lines 158 and 160. Comparing means 128h then compare the measured spacing between the first and second imaginary lines 158, 160 to the preprogrammed criteria contained on the database 52a for verifying that the measured spacing corresponds with an expected width of the license plate character set having a character set height within a range of expected heights. Therefore, if the joining means 128e formulates two imaginary lines between the baseline 91 and top line 92 which are too close together, as sensed by the comparing means 128h, to correspond with the width of a license plate character set having a height as measured by the measuring means 128g, the tilt compensating means 128a rejects the formed lines as acceptable imaginary lines and continues its search for locations along the length of the plate where formed imaginary lines are acceptable to the database criteria.

In accordance with the present invention, the reader 10 includes multiple line-checking means 135 for determining whether the character set of the license plate 14 is contained on two or more lines. In this connection, scanning means 135a scans the plate 14 generally along horizontal paths from the bottom of the plate toward the top thereof so that if the plate contains two rows of characters, the bottom row of the two will be the first to be encountered and subsequently traced by the contour tracing means 128. Furthermore, the database 52a contains criteria relating to expected or acceptable heights of license plates as a function of the length of the character set, and comparing means 135b compares the height of the first or bottom row of characters with the plate-height criteria contained on the database 52a to determine whether the height of the first character row corresponds with the expected height of a license plate having a character set length equal to about the measured length of the first row of license plate characters.

If the measured height of the first character row corresponds with the plate-height criteria, the reader 10 presumes that the scanned plate has only one row of characters. If on the other hand, if the height of the first character row does not correspond with the plate-height criteria, such as probably is the case if there are two rows of characters, the scanning means 135a continues to scan upwardly along the plate from the first row of characters for the purpose of sensing the existence and presence of intensity transitions associated with a second, or upper, row of license plate characters. When a second row of characters is sensed, the aforedescribed components associated with the character extractor 102 locates and traces the characters of the second row for identification purposes.

After all of the characters 89 of the set 85 have been traced by section 102, the characters 89 are recognized in section 104. The first step of character recognition is performed by the structural analysis section 136 to determine the shape of the convex hull, the shape, number and position of bays, and the shape, position and number of holes in each character. After these parameters have been determined, the character recognition section 138 performs a structural analysis based on the convex hulls, bays and holes to determine the identity of each character. The structural analysis section 136 and the character recognition section 138 function in a manner based on structural character recognition methodology.

In the state recognition section 106, the plate 14 is scanned by scanning means 141 in a search for decorative characteristics of the plate image as a function of the image intensity transitions associated with the decorative characteristics. For example, if the plate has horizontal bands or possesses decorative graphics, such as the shamrock 162 illustrated on plate 14 of FIG. 4, such bands or graphics will be responsible for the generation of image intensity transition patterns as the bands or graphics are scanned. Once the patterns of the decorative characteristics are sensed, the patterns are compared in a state recognition section 142 to preprogrammed criteria contained within the database 52a for purposes of matching the sensed patterns to one of a number of known transition patterns relating to the decorative characteristics of plates of several states. Once the sensed patterns are matched with an intensity transition pattern on the database 52a, the state associated with the matched database pattern is identified by the state recognition Section 142 as the state which issued the plate 14.

So that the state recognition section 106 is not required to rely entirely on the sensed patterns relating to decorative characteristics for the identification of the plate-issuing state, the scanning means 141 is adapted to scan the plate 14 for the purpose of sensing image intensity transitions associated with non-decorative characteristics of the plate and which aid in the identification of the plate-issuing state. Such non-decorative characteristics can include the distance between the character set 85 and the logo, the positioning of the state logo adjacent the top of the plate as opposed to the bottom thereof, whether the characters 89 are light on a dark background 83 or dark on a light background, whether or not the plate possesses a validation stickers, such as validation sticker 164, illustrated on plate 14 of FIG. 4, adjacent the a plate corner, and the existence and location of "holes" in the logo characters such as, for example, the existence of one "hole" in the letter "A" in the state of FRANKLIN logo 166 illustrated on plate 14 of FIG. 4. The state recognition section 106 then identifies the state based on the sensed patterns relating to the non-decorative plate characteristics by comparing the sensed patterns to frequency of preprogrammed intensity criteria contained within the database 52a, which criteria includes intensity transition patterns associated with the non-decorative identification characteristics of plates of several states. Upon matching an intensity transition pattern contained on the database 52 with any of the sensed intensity transition patterns relating to the aforedescribed non-decorative characteristics, the state which corresponds to the matched intensity transition pattern of the database 52a is identified as the state which issued the plate 14.

In some instances, it may be difficult for the reader 10 to precisely match the intensity transition pattern associated with the aforedescribed decorative and non-decorative characteristics with corresponding patterns contained within the database 52a. Therefore and in such an instance, the state recognition section 142 is adapted to perform a best guess based upon the intensity transition patterns of a state which most closely match the intensity transition patterns sensed.

In the preferred embodiment, the processing sub-system 20 learns the characteristics associated with the decorative and non-decorative state identification information borne by plates and generates its own original database. To learn, the system 20 receives a command to learn and is provided an image of a license plate. Selected locations of the plate are scanned and state-identification information is located. Then, the image intensity transition patterns generated by such information is stored in database 52a for a state, country or province identified by the operator for the controller 52. This learning capability of the subsystem 20 permits the addition of new state-identification data in the field if desired or necessary.

When the state has been recognized, the verification section 108 reanalyzes the identified license plate character set 85 to ensure that it has been properly interpreted. The verification section 108 adjusts the recognition of characters on a license plate according to the state of the license plate. To this end and in accordance with the present invention, the verification section 108 includes adjusting means 108a for adjusting the alphanumeric pattern of the identified characters 89 to conform the alphanumeric pattern to that of an acceptable character set of the state which has been identified as the plate-issuing slate. In this connection, the database 52a contains criteria relating to the alphanumeric patterns of character sets of plates issued by each of several states. Comparing means 108b are associated with the adjusting means 108a for comparing the alphanumeric pattern of the identified characters to the acceptable alphanumeric patterns contained on the database 52a and the adjusting means 108a changes, when necessary, selected ones of the identified characters 89 so that the alphanumeric pattern of the identified character set conforms to an acceptable alphanumeric pattern of the issuing state.

In the preferred embodiment, the verification section 108 is adapted to change preselected characters identified as letters to numerals and to change preselected characters identified as numerals to letters when such is necessary to conform the alphanumeric pattern of the identified character set to that of the database criteria. For example, a license plate character 89 may be identified as any of the letters B, D, L, Q, R and Y or any of the numerals 0, 1, 2, 3, 4, 5, 6, 7 or 8 and the alphanumeric pattern of the set of identified characters fail to match an acceptable alphanumeric pattern of the database criteria. Under these circumstances and for purposes of illustration, the adjusting means 108a changes at least one of the identified characters to a corresponding numeral or letter in accordance with the tables listed below so that the resulting alphanumeric pattern matches an acceptable alphanumeric pattern of the database criteria.

| IF IDENTIFIED AS THIS LETTER | NUMERAL CHANGED TO | IF IDENTIFIED AS THIS NUMERAL | LETTER CHANGED TO |
| --- | --- | --- | --- |
| B | 8 | 0 | Q |
| D | 0 | 1 | I |

| IF IDENTIFIED AS THIS LETTER | NUMERAL CHANGED TO | IF IDENTIFIED AS THIS NUMERAL | LETTER CHANGED TO |
|---|---|---|---|
| L | 1 | 2 | Z |
| Q | 0 | 3 | J |
| R | 8 | 4 | X |
| Y | 5 | 5 | S |
| | | 6 | O |
| | | 7 | T |
| | | 8 | B |

After the operation of the verification section 108, the identified character set 85 and the identity of the state which issued the plate 14 are fed to the control computer 52 for further processing.

It will be understood that numerous modifications can be had to the aforedescribed embodiments without departing from the spirit of the invention. For example, although many of the components of the aforedescribed reader have been described as including scanning means adapted to scan the plate in search of predetermined intensity transition characteristics, a reader in accordance with the present invention may include a single scanner adapted to scan the plate once over the entire area thereof and feed all of the intensity transition information which will subsequently be needed at the various stages of the reader operation to an information-storing array. Then, when various intensity transition information is needed for a stage of the reader operation, such information is drawn from the array for use. Accordingly, the aforedescribed embodiments are intended for the purpose of illustration and not as limitation.

What is claimed is:

1. In an apparatus for finding and identifying the characters of a license plate having a set of characters including means for producing an image that includes the license plate, and means for recognizing and identifying the characters of the license plate, the improvement comprising:
    plate finding means associated with said recognizing and identifying means including:
        a) a database containing criteria relating to the expected height of license plate characters contained within the produced image;
        b) means for scanning one-line-at-a-time for a predetermined distance across a portion of the license plate character set from a location situated between the top and bottom boundaries of the character set and moving one-line-at-a-time across said character set portion toward the top boundary thereof and moving one-line-at-a-time across said character set portion toward the bottom boundary thereof so that the license plate character set is scanned generally upwardly and downwardly along one vertically-oriented column having a width which is equal to said predetermined distance, each of said scanned lines having an associated average gray level intensity and a gray level variance;
        c) means for measuring the average gray level intensity and the gray level variance along the scanned lines;
        d) means for sensing at a location adjacent the top boundary of the character set a significant decrease in the gray level variance and the average gray level intensity between one scanned line and another scanned line as said one and another lines are scanned in sequence and identifying said one scanned line as the tip edge of the character set;
        e) means for sensing at a location adjacent the bottom boundary of the character set a significant decrease in the average gray level intensity and gray level variance between two successively-scanned lines and identifying the first of said two successively-scanned lines as the bottom edge of the character set; and
        f) means for measuring the distance between the identified tip and bottom edges of the character set portion and for comparing the measured distance to height criteria contained within said database to determine whether the measured distance corresponds to an expected height of the character set.

2. The improvement of claim 1 wherein said database contains criteria relating to the expected width of license plate characters and to the expected width of the license plate character set contained within the produced image and the scanning means is adapted to scan across said portion of said license plate character set a distance corresponding to said width criteria so that the width of the column scanned by said scanning means is at least as great as the expected width of a license plate character contained within the produced image and less than the expected width of the character set contained within the produced image.

3. The improvement as defined in claim 1 wherein said measured distance between the identified top and bottom edge is a first measured distance and said improvement further comprises verification means associated with the plate finding means for confirming that the image of the license plate is contained within an identified image block, wherein:
    said means for scanning scans one-line-at-a-time for a second predetermined distance across another portion of the license plate character set from a location situated between the top and bottom boundaries of the license plate character set and moving one-line-at-a-time across said another character set portion toward the top boundary thereof and moving one-line-at-a-time across said another character set portion toward the bottom boundary thereof so that the license plate character set is scanned generally upwardly and downwardly along another vertically-oriented column, said another column and said one column being disposed in overlapping relationship to one another, each of said scanned lines within said another column having an associated average gray level intensity and a gray level variance;
    said means for measuring the average gray level intensity and the gray level variance measures the average gray level intensity and gray level variance along the lines scanned in said another column;

said means for sensing at a location adjacent the top boundary of the character set senses a significant decrease in the average gray level intensity and gray level variance between one scanned line and another scanned lines in said another column as said one and another line in said another column are scanned in sequence and identifying said one line of said another column as the top edge of the character set;

said means for sensing at a location adjacent the bottom boundary of the character set senses a significant decrease in the average gray level intensity and the gray level variance between two successively-scanned lines in said another column and identifying the first of said two successively-scanned lines in said another column as the bottom edge of the character set;

said means for measuring measures the distance between the identified tip and bottom edges of the character set in said another column to obtain a second measured distance, said verification means further comprising means for comparing the second measured distance to the first measured distance to determine whether the said measured distance corresponds to the first measured distance.

4. The improvement of claim 3 wherein said database contains criteria relating to the expected width of a license plate character set and said verification means includes means for identifying the left and right side edges of the character set, means for measuring the distance between the identified left and right side edges and means for comparing the measured distance between the identified left and right side edges of the characters set with the character set width criteria contained with the database to determine whether the measured distance between the identified side edges corresponds to an expected width of the character set.

5. The improvement as defined in claim 4 wherein said identifying means of said verification means is adapted to scan the character set in a columnar fashion toward the left and right of the one column so that the character set is scanned in a series of overlapping columns and includes measuring means for measuring the height of the character set in each sequentially-scanned column, comparing means for comparing the measured character set height in each column scanned to the height measured in a previously-scanned column to thereby find two consecutive columns adjacent the right and left side edges of the plate reflecting a character set height which does not match the measured height of a previously-scanned column and means for identifying the locations adjacent the sides of the plate at which the consecutive non-matching columns are found as the left and right edges of the plate.

6. In an apparatus for reading the characters of a license plate including means for scanning the license plate and for locating the characters of the license plate as a function of sensed image intensity changes as the license plate is scanned, character alignment means for defining a straight baseline and a straight top line based on the bulk of the lowermost and uppermost points of the characters, and identifying the license plate characters, the improvement comprising:

detecting means associated with the character alignment means for detecting the presence and location of intensity transitions along each of the baseline and top line that are nearest the left edge of the license plate and for detecting the presence and location of the intensity transitions along each of the baseline and top line that are nearest the right edge of the license plate and for joining each of the intensity transition locations detected adjacent the left edge of the license plate with an imaginary first line and for joining each of the intensity transition locations detected adjacent the right edge of the license plate with an imaginary second line, and said contour tracing means is adapted to disregard license plate information sensed to the left of the first imaginary line and to disregard license plate information sensed to the right of the second imaginary line.

7. The improvement of claim 6 further a database associated with said detecting means containing preprogrammed criteria relating to an expected width of a license plate as a function of the height of the character set, means for measuring the spacing between the imaginary first and second lines and the height of the character set and means for comparing the measured spacing between the imaginary first and second lines to the preprogrammed criteria for verifying that the spacing between the first and second imaginary lines corresponds with an expected width of a character set.

8. In an apparatus for reading the characters of a license plate including means for scanning the license plate and for locating the characters of the license plate as a function of sensed image intensity changes as the license plate is scanned, character alignment means for defining a straight baseline and a top line based on the bulk of the lowermost and uppermost points of the characters, and means for recognizing and identifying the characters of the license plate, the improvement characterized in that:

said character alignment means includes means for detecting the presence and location of an intensity transition along a low path extending parallel to and positioned adjacent and below the defined straight baseline and the existence and location of an intensity transition along a high path extending parallel to and positioned adjacent and above the defined top line; and means for comparing the location of the detected intensity transition along the low path with the location of the detected intensity transition along the high path and determining whether the compared locations are positioned in a vertical relationship with respect to one another;

said recognizing and identifying means is adapted to disregard license plate information below said baseline and above said top line when each of compared locations is determined to be in a vertical relationship with respect to another one of the compared locations and to disregard license plate information below said low path and above said high path when any of the compared locations is determined not to be in a vertical relationship with another one of the compared locations so that when one compared location is determined not to be in a vertical relationship with any other compared location, at least a portion of the license plate region responsible for the intensity transition sensed along one of the high and low paths and at said one compared location is utilized in the identification of the license plate characters.

9. In an apparatus for reading of a license plate having a set of characters including means for scanning the license plate and means for locating the of the license plate characters as a function of sensed image intensity changes as the license plate is scanned, and means for recognizing and identifying the characters of the license plate, the improvement comprising:

a database containing criteria relating to expected heights of license plates as a function of the length of the license plate character set;

a scanner for vertically scanning the plate first row of license plate characters;

means for measuring the height and length of the first row of license plate characters scanned by said scanner;

means for comparing the height of the first row of characters with the plate-height criteria contained on the database to determine whether the height of the first row of characters corresponds with the expected height of a license plate having a character set length equal to about the measured length of the first row of license plate characters;

said scanner is adapted to continue scanning vertically from the first row of license plate characters for sensing the presence of intensity associated with a second row of license plate characters when the comparing means determines that the height of the first row of characters does not correspond with an expected height of a license plate having a character set length equal to about the sensed length of the first row of license plate characters;

said locating means is adapted to locate the characters in each row of characters scanned in the license plate as a function of the intensity transitions sensed in connection with each row; and     said recognizing and identifying means is adapted to recognize and identify the characters in each row of license plate characters.

10. In a method for finding and identifying the characters of a license plate having a set of characters including the steps of producing an image that includes the license plate, scanning the image and identifying a block of the image which is the image of the license plate, locating the license plate characters as a function of sensed image intensity changes as the license plate is scanned, and recognizing and identifying the characters of the license plate as a function of the traced contours, the improvement comprising:

providing criteria relating to the expected height of license plate characters contained within the produced image;

scanning one-line-at-a-time for a predetermined distance across a portion of the character set from a location situated between the top and bottom boundaries of the character set and moving one-line-at-a-time across the character set portion toward the top boundary thereof and moving one-line-at-a-time across the character set so that the license plate character set is scanned generally upwardly and downwardly along one vertically-oriented column having a width which is equal to the predetermined distance;

measuring the average gray level intensity and the gray level variance along the scanned lines;

sensing at a location adjacent the top boundary of the character set a significant decrease in the measured average gray level intensity and gray level variance between one scanned line and another scanned line as the one and another lines are scanned in sequence and identifying the one scanned line as the top edge of the character set;

sensing at a location adjacent the bottom boundary of the character set a significant decrease in the measured average gray level intensity and gray level variance between two successively-scanned lines and identifying the first of the two successively-scanned lines as the bottom edge of the character set;

measuring the distance between the identified top and bottom edges of the character set; and     comparing the measured distance to the provided height criteria to determine whether the measured distance corresponds to an expected height of the character set.

11. The improvement as defined in claim 10 wherein the measured distance between the identified top and bottom edges is a first measured distance and said improvement further comprises the steps of:

scanning one-line-at-a-time for a predetermined distance across another portion of the license plate character set from a location situated between the top and bottom boundaries of the license plate character set and moving one-line-at-a-time across the another character set portion toward the top boundary of the character set and moving one-line-at-a-time across another character set portion toward the bottom boundary of the character set so that the license plate character set is scanned generally upwardly and downwardly along a second column overlapping the one column;

measuring the average gray level intensity and the gray level variance along the lines scanned in the second column;

sensing at a location adjacent the top boundary of the character set a significant decrease in the measured one of the average gray level intensity and gray level variance between one line and another scanned line as the one and another lines in the second column are scanned in sequence and identifying the one line of the second column as the top edge of the character set;

sensing at a location adjacent the bottom boundary of the character set a significant decrease in the measured average gray level intensity and the gray level variance between two successively-scanned lines in the second column and identifying the first of the two successively-scanned lines in the second column as the bottom edge of the character set;

means for measuring the distance between the identified top and bottom edges of the character set in the second column; and     comparing the second measured distance to the first measured distance to determine whether the second measured distance corresponds to the first measured distance.

12. The improvement of claim 11 further comprising the steps of:

providing criteria relating to the expected width of a license plate character set;

identifying the left and right side edges of the character set;

measuring the distance between the identified left and right side edges; and     comparing the measured distance between the left and right side edges of the character set with the provided width criteria to determine whether the measured distance between the identified side edges corresponds to an expected width of the character set.

13. In a method for reading the characters of a license plate having a set of characters including the steps of scanning the license plate and locating the characters of the plate as a function of sensed image intensity changes as the license plate is scanned, defining a straight baseline and a straight top line based on the bulk of lowermost and uppermost points of the characters, and recognizing and identifying the license plate characters, the improvement comprising:

detecting the presence and location of intensity transitions along each of the baseline and top line that are nearest the left edge of the license plate and detecting the presence and location of the intensity transitions along each of the baseline and top line that are nearest the right edge of the license plate;

joining each of the intensity transition locations detected adjacent the left edge of the license plate with an imaginary first line and joining each of the intensity transition locations detected adjacent the right edge of the license plate with an imaginary second line; and disregarding license plate information sensed to the left of the first imaginary line and disregarding license plate information sensed to the right of the second imaginary line.

14. The improvement of claim 13 further the steps of:

providing criteria relating to an expected width of a license plate as a function of the height of the character set; and measuring the spacing between the imaginary first and second lines and the height of the character set and comparing the measured spacing to the provided criteria for verifying that the spacing as measured between the first and second lines corresponds with an expected width of a license plate.

15. In a method for reading the characters of a license plate including the steps of scanning the license plate and locating the characters of the license plate as a function of sensed image intensity changes as the license plate is scanned, defining a straight baseline and a straight top line based on the bulk of the lowermost and uppermost points of the characters, and recognizing and the characters of the license plate, the improvement comprising:

detecting the presence and location of an intensity transition along a low path extending parallel to and positioned adjacent and below the defined straight baseline and the existence and location of an intensity transition along a high path extending parallel to and positioned adjacent and above the defined top line;

comparing the location of the detected intensity transition along the low path with the location of the detected intensity transition along the high path and determining whether the compared locations are positioned in a vertical relationship with respect to one another; and disregarding license plate information below the baseline and above the to line when each of the compared locations is determined to be in a vertical relationship with respect to another of the compared locations and disregarding license plate information below the low path and above the high path when any of the compared locations are not determined to be in a vertical relationship with another one of the compared locations so that when one compared location is determined not to be in a vertical relationship with any other compared location, the steps of recognizing and identifying utilize at least a portion of the license plate region responsible for the intensity transition sensed along one of the low and high paths and at the one compared location in the identification of the license plate characters.

16. In a method for reading a license plate having a set of characters including the steps of scanning the license plate and locating the edges of the characters of the license plate as a function of sensed image intensity changes as the license plate is scanned, defining a straight baseline and a straight top line based on the bulk of the lowermost and uppermost points of the characters, tracing the contours of the edges of the license plate and recognizing and identifying the characters of the plate as a function of the traced contours, the improvement comprising:

identifying two left corners of the character set of the license plate wherein one of the left corners is contained along the defined baseline and the other of the left corners is contained along the defined top line;

identifying two right corners of the character set wherein one of the right corners is contained along the defined baseline and the other of the riqht corners is contained along the defined top line;

joining the identified two left corners with an imaginary first line and joining the identified two right corners with an imaginary second line; and following during the tracing step what would otherwise be considered as a vertical edge of a character along a path which is generally parallel to one of the imaginary first and second lines.

17. The improvement of claim 16, wherein the steps of identifying the two left and two right corners of the plate include the steps of:

a) scanning the license plate one-line-at-a-time along lines extending generally vertically across the license plate character set beginning at a predetermined location between the right and left boundaries of the license plate character set and moving one-line-at-a-time toward each of the right and left boundaries of the character set;

b) measuring the gray level variance along the generally vertically-scanned lines;

c) sensing a significant decrease in gray level variance on the right side of the license plate character set from one generally vertically-scanned line to another generally vertically-scanned line and sensing a significant decrease in gray level variance on the left side of the license plate character set from a first generally vertically-scanned line to a second generally vertically-scanned line; and d) identifying as the two left corners of the character set the locations along the baseline and the top line which correspond to the site along the left side of the character set at which the significant decrease in gray level variance is sensed and identifying as the two right corners of the character set the locations along the baseline and top line which correspond to the site along the right side of the character set at which the significant decrease in gray level variance is sensed.

18. The improvement of claim 16 further comprising the steps of:

providing criteria relating to an expected width of a license plate character set as a function of the height of the license plate character set;

measuring the height of the character set and spacing between the imaginary first and second lines; and comparing the measured spacing between the first and second lines to the provided criteria for verifying that the measured spacing corresponds with an expected width of a license plate character set.

19. In a method for reading a license plate having a set of characters including the steps of scanning the license plate and locating the characters of the license plate as a function of sensed image intensity changes as the license plate is scanned, and recognizing and identifying the characters of the license plate the improvement comprising:

providing criteria relating to the expected heights of license plates as a function of the length of the license plate character set;

scanning the license plate from one of the bottom and top of the plate toward the other of the bottom and top of the plate and through a first row of license plate characters;

measuring the height and length of the first row of license plate characters;

comparing the measured height and length of the first row of characters with the provided plate-height criteria to determine whether the height of the first row of characters corresponds with the expected height of a license plate having a character set length equal to about the measured length of the first row of characters;

scanning from the first row of characters toward the other of the bottom and top of the plate;

sensing the presence of and intensity transitions associated with a second row of license plate characters when it is determined that the height of the first row of characters does not correspond with an expected height of a license plate having a character set length equal to about the sensed length of the first row of license plate characters;

locating the characters in the second row of characters as a function of the intensity transitions sensed in connection therewith; and recognizing and identifying the characters in the second row.

* * * * *